April 19, 1938.    J. C. CLARK    2,114,591
LIGHT SENSITIVE BRIDGE
Filed Aug. 23, 1935
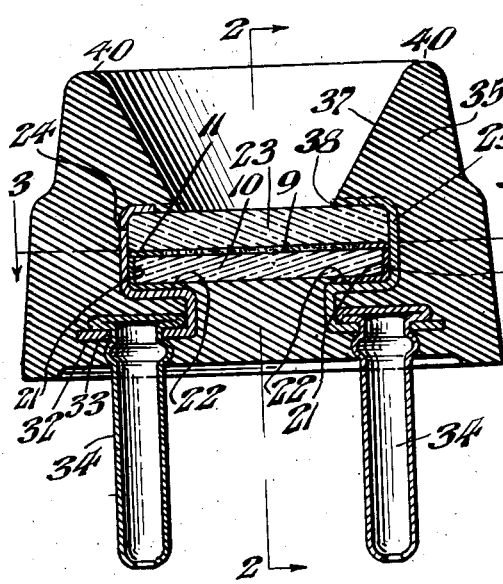
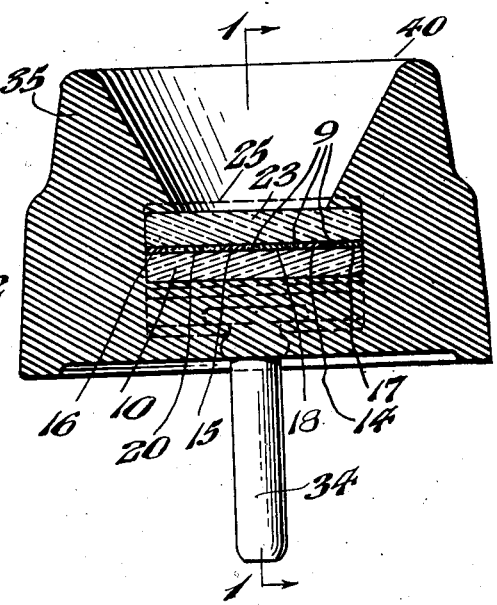
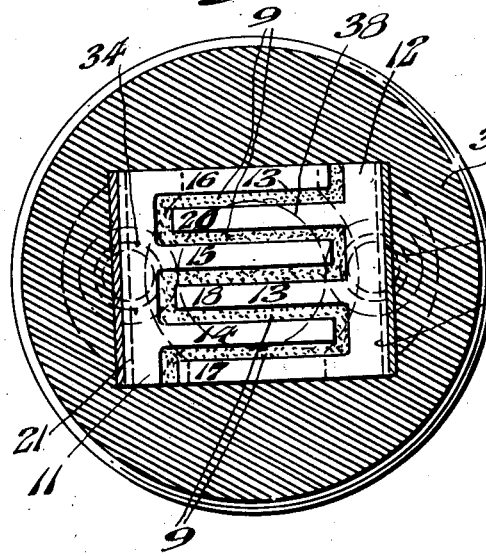
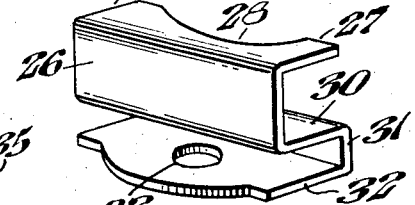
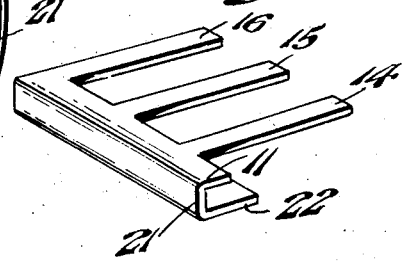
INVENTOR
JOSEPH C. CLARK,
BY
Frank H. Borden
ATTORNEY Patented Apr. 19, 1938

2,114,591

UNITED STATES PATENT OFFICE 2,114,591

LIGHT SENSITIVE BRIDGE

Joseph C. Clark, Merchantville, N. J., assignor to Hugh H. Eby, Inc., Philadelphia, Pa., a corporation of Pennsylvania Application August 23, 1935, Serial No. 37,480

7 Claims. (Cl. 201—63)

This invention relates to a light sensitive bridge and to the method of making same, and relates particularly to photo-electric cells of the variable resistance type.

As such cells have been constructed in the past they have had relative instability, variation in response to accordance with variations in humidity conditions, short life, lack of sensitivity to minute changes in stimulus, etc.

It is among the objects of this invention; to obviate these disadvantages of the prior art; to provide a method of making a photo-electric cell of the resistance type by which an improved cell is produced; to provide a light sensitive cell of stability and high sensitivity; to provide a light sensitive cell which is unaffected by moisture conditions in the atmosphere; to provide a light sensitive cell with a converging hood or protecting shield for directing and reflecting light rays striking the cell at certain desired angles only to incidence upon the sensitive surface; to provide a light sensitive cell which is improved by curing at a desired temperature simultaneously with the provision of a fused housing; to provide a unitary molded sealed moisture proof housing for a light sensitive bridge; to provide a light sensitive cell with a one-piece molding housing; to mold a housing about a portion of a light sensitive bridge; and many other objects and advantages as will become more apparent as the description proceeds.

In the accompanying drawing forming part of this description;

Fig. 1 represents a vertical section through a cell constructed in accordance with the preferred form of the invention, Fig. 2 represents a transverse vertical section through the cell of Fig. 1 taken on line 2—2 thereof, Fig. 3 represents a transverse horizontal section through the cell of Fig. 1, taken on line 3—3 thereof, Fig. 4 represents an enlarged perspective of a clamp unit of the assembly by which simultaneously two rigid plates are clamped together and electrical connection is established between a contact prong and a conductor engaged between plates, and Fig. 5 represents a perspective of a sheet of foil as it may be formed, illustratively, to fit over one plate and in contact with the clamp of Fig. 4.

In carrying out this invention in a preferred form, a transparent tablet has a layer of conducting material spaced to form a gap which is encased under pressure in a single unitary molded housing.

In practicing the invention, there is provided preferably an insulating supporting plate 10, which can be opaque and of any sort of material if desired, but which preferably is of transparent glass having a polished surface. In the first step in the process the plate 10 has applied to its upper surface contact elements 11 and 12, with fingers in staggered relation to form a circuitous or tortuous path 13, which path is coated on the glass surface with light sensitive material 9 such as selenium, thallium, tellurium, silver oxide, bismuth sulphide, or the like. The contact elements 11 and 12 are preferably of metal foil, and respectively have any desired number of fingers, illustratively 14, 15, 16 on element 11, and 17, 18 and 20 on element 12. Each element is long enough to have a portion 21 to abut the end of the plate 10, and a terminal portion 22 to engage beneath the plate 10, and a terminal portion 22 to engage beneath the plate for a short distance. Preferably the foil elements 11 and 12 are secured to the support plate 10 by suitable adhesive.

The plate 10 with the foil and sensitive material properly disposed upon it, is preferably provided with a window plate 23. This is of material such as will transmit desired radiations such as the infra-red or ultra-violet light, or it may comprise a material transparent to all wave lengths of light.

The sealing window 23 is superimposed upon the foil and sensitive path assembly on the insulation support plate 10, and held firmly thereon, while preferably but not necessarily spring clips or clamps 24 and 25 are applied. Each spring clamp comprises the vertical wall 26 having the upper flange 27, cut away on an arc in the center as at 28, and having the lower flanged extension 30, in parallelism with the upper flange 27, and bent downwardly as at 31 into a reentrant terminal flange 32 having the prong aperture 33, in which the prong 34 is threaded and upset to anchored relation with the terminal 32. Each clamp is pushed longitudinally upon the assembled pair of plates 10 and 23, and although resilience is not essential is preferably sufficiently resilient as to frictionally hold the plates together and itself in position. It will be observed that the pushing of the clamps upon the depending surfaces 21 and 22 of the foil contacts or connectors, extending outwardly of the pair of plates, causes the vertical wall 26 to engage the end wall 21 of the foil connector, and the terminal portion 22, beneath the support plate is brought into intimate electrical contact with the flange 30 of the clamp. It will thus be observed that through intimacy of physical engagement of the clamps and the foil connectors, each side of the path 13 is directly connected electrically with the opposed prongs 34 of the respective clamp elements 24 and 25. The plates, clamps and prongs are thus assembled as units, which may be preformed and set aside until the molding takes place. Obviously the prongs 34 can be directly connected to the metal foil or other contacts and the clamps can be dispensed with, if desired. It will be clear also that the contacts and sensitive surface can be disposed, as shown directly in engagement with the lower surface of window plate 23, and the primary support plate 10 can be dispensed with, although it is preferred to use the supporting plate.

The sensitive unit is held by suitable dies or the like, while the molded housing 35 is formed about it. The important thing about the molding is the fact that the material used, which is an insulating material, is one which is fused by heat and shaped by pressure. A preferred material is a phenolic condensation product, which may be put into a mold of any desired characteristics (not shown) in powdered form, in perhaps twice or more than twice the volume of the finished article, and which material is then subjected to pressure and temperature at which time the powder turns to the solid integral housing shown in the drawing. During the molding, the parts of the sensitive unit of course have been subjected to the same pressures, and to the same temperatures, so that when the fusion takes place the parts in the mold remain under a state of high compression and this pressure remains permanently.

The fusion of the conventional forms of the phenolic condensates effects or works a heat curing that is beneficial to the material, and which increases its sensitivity. The heat treatment incident to molding may be protracted for any desired curing time interval to obtain the best results from the sensitive material.

The cell, as formed is characterized in the preferred form by the provision of a visor or hood 36 extending substantially concentrically of the cell 35, having an elongated inwardly tapering reflector surface 37, the walls of which are relatively at approximately 60° to each other, although obviously any other angular relation may be used, having a small inner ring opening 38 in contact with the upper surface of the sealing plate 23 throughout its entire periphery, so that all of the side edges, and the margins of all top edges of the plate assembly is housed in the protecting molding or housing. The divergent walls 37 terminate in a larger substantially concentric rim 40. It will be clear that the cell so formed may utilize the sealing glass to enable light rays to pass laterally of the small inner ring 38 to incidence upon sensitive material normally covered by the hood or visor.

It will be understood that the prongs or other contact elements 34 could take any desired form and be guided from the molding in any desired direction, so as to be capable of having connectors soldered thereto, or for insertion in any desired socket. It will be noted that the prongs 34 as shown, in parallelism, could be removably frictionally engaged in the contacts of a conventional vacuum tube socket. The water-proof nature of the assembly will be understood.

I claim:

1. A light sensitive bridge consisting of a light sensitive unit having a window molded into a unitary housing under elevated heat and pressure conditions to effect sensitization and maintenance of the sensitization by creation of pressure internally of the housing.

2. A method of curing the light sensitive material of a light sensitive bridge which consists in molding a fusible material around the bridge as a housing at a temperature substantially that proper for curing the light sensitive material, and in maintaining the pressure until after the fusible material has set so as to establish pressure internally of the housing.

3. A method of curing the light sensitive material of a light sensitive bridge which consists in forming under pressure and heat a molded housing around the material and continuing the application of said heat for a curing interval.

4. A variable light sensitive resistance cell comprising an insulating base plate, a pair of spaced contact elements carried on said plate, light sensitive material on the plate in the space between the contacts, said contacts having portions projecting beyond the ends of the plate, a sight window comprising a transmitting plate of insulating material overlying the insulating plate and the contacts and sensitive material thereon, clamps engaging the ends of the juxtaposed plates and electrically contacting the projecting ends of the contact elements and holding the plates together, terminals electrically engaged by the clamps, a molded integral unitary housing surrounding and engaging the assembled contacts and plates having a light opening registering with the sight window plate, and said terminals projecting out of said housing.

5. A light sensitive bridge comprising an insulating base plate, a pair of spaced contact elements carried on said plate, light sensitive material on the plate in the space between the contacts, a sight window comprising a transmitting plate of insulating material overlying the insulating plate and the sensitive material thereon, terminals in electrical connection with the contact elements, a molded integral unitary housing surrounding and engaging the assembled plates and terminals and having a light opening registering with the sight window plate, and said terminals having portions extending beyond the housing.

6. A method of forming a light sensitive bridge which consists in forming a light sensitive unit comprising a transparent insulating plate with curable sensitive material and spaced contacts adjacent to the plate, and then in molding a housing having an opening adjacent to the plate by disposing phenolic condensation material about the upper edges of said plate and completely about the remainder of said unit and subjecting same to pressure to fuse the phenolic condensation material into a housing, and in maintaining the pressure for an interval sufficient both to cure the sensitive material and complete the molding of the housing.

7. A method of forming and curing a light sensitive bridge which consists in forming a light sensitive unit of spaced plates enclosing spaced contacts and curable sensitive material, and then in molding from phenolic condensation material under elevated heat and pressure conditions a housing around the unit, and in maintaining the heat condition for an interval sufficient to cure the sensitive material.

JOSEPH C. CLARK.